United States Patent [19]

Nagata

[11] Patent Number: 4,689,192

[45] Date of Patent: Aug. 25, 1987

[54] NUCLEAR FUSION REACTOR

[75] Inventor: Daisaburo Nagata, Kobe, Japan

[73] Assignee: Mitsubishi Denki Kabushiki Kaisha, Tokyo, Japan

[21] Appl. No.: 643,313

[22] Filed: Aug. 22, 1984

[30] Foreign Application Priority Data

Aug. 30, 1983 [JP] Japan ................................ 58-160644

[51] Int. Cl.$^4$ .............................................. G21B 1/00
[52] U.S. Cl. .................................... 376/150; 376/142; 376/143
[58] Field of Search ....................... 376/150, 142, 143; 174/153 G

[56] References Cited

U.S. PATENT DOCUMENTS

| 3,054,742 | 9/1962 | Thonemann et al. | 376/150 |
| 3,109,801 | 11/1963 | Thonemann | 376/150 |

FOREIGN PATENT DOCUMENTS

| 0009799 | 1/1977 | Japan | 376/150 |
| 0017198 | 2/1977 | Japan | 376/150 |
| 0138998 | 10/1979 | Japan | 376/150 |
| 1029932 | 5/1966 | United Kingdom | 174/153 G |

Primary Examiner—Harvey E. Behrend
Attorney, Agent, or Firm—Wenderoth, Lind & Ponack

[57] ABSTRACT

A nuclear fusion reactor has a toroidal, electrically conductive shell and an air-core current transformer coil with a single turn disposed on the outer peripheral side of the shell, a plurality of port holes provided in the shell to be radially aligned with those in the coil respectively, the shell and the coil being coated with electrically insulating layers of the FBC type except for each of the port holes and its adjacent portion which are electrically insulated by one pair of electrically insulating insertions having cylindrical sections fitted into the port hole from both ends to be superposed on each other and flange sections radially extending from the opposite ends of the superposed cylindrical sections and disposed on the opposite surface portions of the shell or the coil adjacent to the port hole, and connected to the mating electrically insulating layer portions, the flange sections located on the shell and the coil to oppose to each other having terminations spaced from each other by a predetermined distance in the radial direction of the associated aligned port holes.

4 Claims, 6 Drawing Figures

NUCLEAR FUSION REACTOR

BACKGROUND OF THE INVENTION

This invention relates to a nuclear fusion reactor comprising a toroidal shell of an electrically conductive metallic material electrically insulated in accordance with a fluidized bed dip coating (which may be abbreviated hereinafter to an "FBC") process with or without an air-core current transformer coil in the form of a toroid electrically insulated in accordance with the FBC process and disposed on the outer peripheral side of the shell. Particularly, the present invention relates to the electrical insulation characteristics of the shell or the shell and the air-core current transformer coil, after the shell or the shell and coil has or have been electrically insulated in accordance with the FBC process.

A conventional nuclear fusion reactor having, for example, a torus shape has comprised a plurality of similar circular coils wound at predetermined equal angular intervals around a toroidal evacuated container of a circular cross section horizontally disposed to establish a toroidal, electrically field within the evacuated container, a toroidal magnetic conductive shell for surrounding the toroidal evacuated container to control the position of a plasma confined within the evacuated container, an air-core current transformer coil in the form of a toroid having a circular cross section disposed on the outer peripheral side of the shell to heat the plasma, and a plurality of vertical and horizontal ports protruding radially of the toroidal evacuated container therefrom and loosely extending through pairs of aligned similar holes disposed in the shell and the coil respectively to observe the plasma confined within the toroidal evacuated container.

The shell and the air-core current transformer coil have generally been electrically insulated by an epoxy resin disposed thereon in accordance with the FBC process. The FBC process, however, is unable to stick the epoxy resin in a layer having a uniform thickness on the surface of each of the shell and coil. The epoxy resin is particularly inclined to stick to the walls of the port holes in the shell and the coil and adjacent portions thereof, and in an extreme case, the port holes might be clogged with the epoxy resin. This has resulted in the necessity of mechanically removing the epoxy resin from the port holes and the adjacent portions and then applying a film or a sheet material such as a polyimide to the exposed walls of the port holes and the exposed adjacent portions. Alternatively, the walls of the port holes and the adjacent portions might be initially applied with such a film or shell material but not electrically insulated in accordance with the FBC process. In recent nuclear fusion reactors operated with high voltages and delivering high outputs, electric discharges have been developed at boundaries between the polyimide films or sheets and the electrically insulating layers of the FBC type disposed on the surface portions adjacent to the port holes of the shell and the air-core current transformer coil and particularly at such boundaries located on the opposite surfaces of the shell and the coil. Those dielectric discharges have frequently resulted in damage to the electrical insulation.

Accordingly, it is an object of the present invention to provide a new and improved nuclear fusion reactor of the type referred to having a high dielectric strength by using electrically insulating insertions to electrically insulate the port holes in the toroidal, electrically conductive shell and the adjacent portions thereof or the port holes in the shell and the air-core current transformer coil and the adjacent portions thereof and to enhance the electrical insulation at boundaries between the electrically insulating insertions and the mating electrically insulating layers of the FBC type.

SUMMARY OF THE INVENTION

The present invention provides a nuclear fusion reactor comprising a toroidal shell of an electrically conductive metallic material including a plurality of holes for plasma observing ports and coated with an electrically insulating layer formed on the surface thereof in accordance with a fluidized bed dip coating process except for the port holes and the adjacent portions therof, and a plurality of insertions formed of an electrically insulating material. Each of the electrically insulating insertions includes a cylindrical section fitted into an associated one of the port holes and a flange section radially extending from one end of the cylindrical section so as to run along the surface portion of the shell adjacent to the associated port hole. Each pair of the electrically insulating insertions electrically insulates an associated one of the port holes and the adjacent portion of the shell so that one insertion in the pair has the cylindrical section snugly fitted into the associated port hole from one end thereof and so that the other insertion in the pair has the cylindrical section snugly fitted into the cylindrical section of the one insertion from the other end of the associated port hole while the pair of the electrically insulating insertions have the flange sections opposing each other through the shell to intimately engage the surface portions of the shell adjacent to the associated port hole and being connected to mating portions of the electrically insulating layer of the fluidized bed dip coating type.

In a preferred embodiment of the present invention, an air-core current transformer coil in the form of a toroid having a circular cross section is further disposed on the outer peripheral side of the toroidal shell to form an annular toroidal gap therebetween. The coil includes a plurality of port holes identical to and radially aligned with the port holes disposed in the shell and is coated with an electrically insulating layer disposed on the surface thereof in a similar manner to that on the shell. Each pair of electrically insulating insertions as described above is operatively coupled to a different one of the port holes in the shell and the current transformer coil and the adjacent portions thereof in the same manner as described in the preceding paragraph to electrically insulate the different one of the port holes and the surface portions of the shell and coil adjacent thereto. However, the flange sections of the electrically insulating insertions disposed on the opposite surfaces of the shell and the current transformer coil to face the annular toroidal gap therebetween have respective terminations spaced away from each other by a predetermined distance in the radial direction of the associated aligned port holes.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
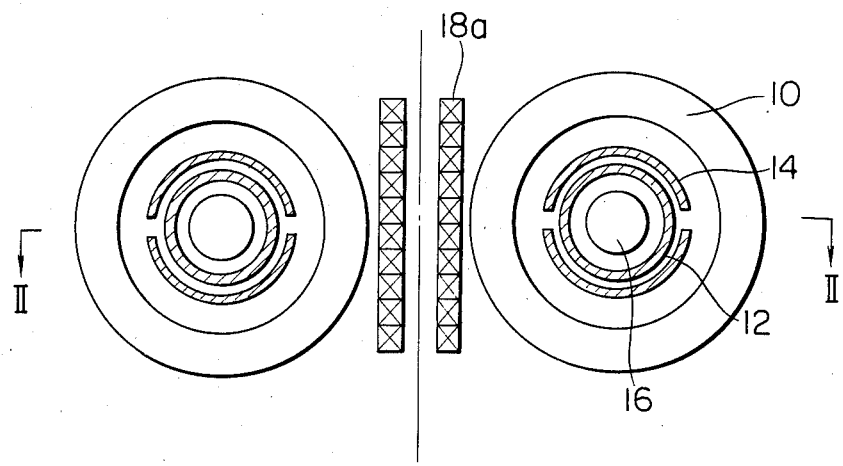
FIG. 1 is a longitudinal sectional view of a conventional torus-shaped nuclear fusion reactor.
Figure 2:
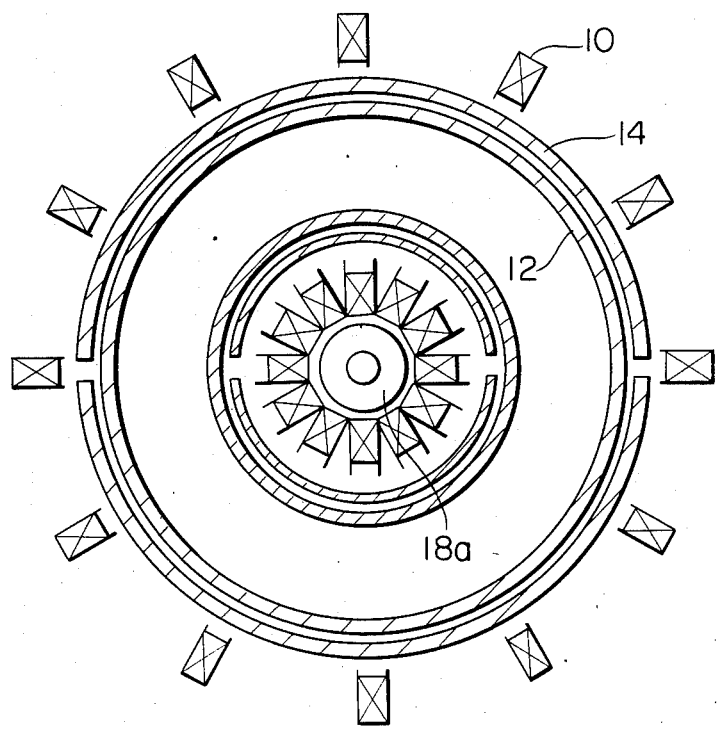
FIG. 2 is a transversal sectional view as taken along the line II—II of FIG. 1.

For a better understanding of the nature of the present invention, a few conventional nuclear fusion reactors will now be described in conjunction with FIGS. 1 through 5. FIGS. 1 and 2 show a conventional torus-shaped nuclear fusion reactor. The arrangement illustrated comprises a plurality of similar circular coils 10 (which are not shown in section in FIG. 1) would at predetermined equal angular intervals around a toroidal evacuated container 12 of a circular cross section horizontally disposed to leave a predetermined annular spacing between each of the circular coils 10 and the adjacent portion of the evacuated container 12 and to establish a toroidal mangetic field within the toroidal evacuated container 12, and a toroidal shell 14 of a circularly annular cross section disposed between the plurality of circular coils 10 and the toroidal evacuated container 12 to surround the latter with an annular toroidal gap left therebetween. The toroidal shell 14 is formed of an electrically conductive metallic material such as copper, an aluminum alloy or a stainless steel so as to be halved in a torus direction as shown in FIG. 2, for the purpose of permeating the resulting magnetic field into the evacuated container 12. The shell 14 controls the position of a plasma 16 confined within the toroidal evacuated container 12 by means of the toroidal magnetic field and a poloidal and a vertical magnetic field due to separate coils (not shown).

In order to heat the plasma 16, a plurality of similar circular windings are disposed to be stacked on one another about the longitudinal axis of the toroidal evacuated container 12 to form an air-core current transformer coil 18a having its axial central plane lying in the horizontal central plane of the evacuated container 12. The air-core current transformer coil 18a generates an induced voltage in the plasma 16 thereby to heat the latter with a current due to that voltage. Also another voltage is induced on the shell 14 to control the position of the plasma 16 in the direction of the major radius thereof with a current due to that voltage.

Figure 3:
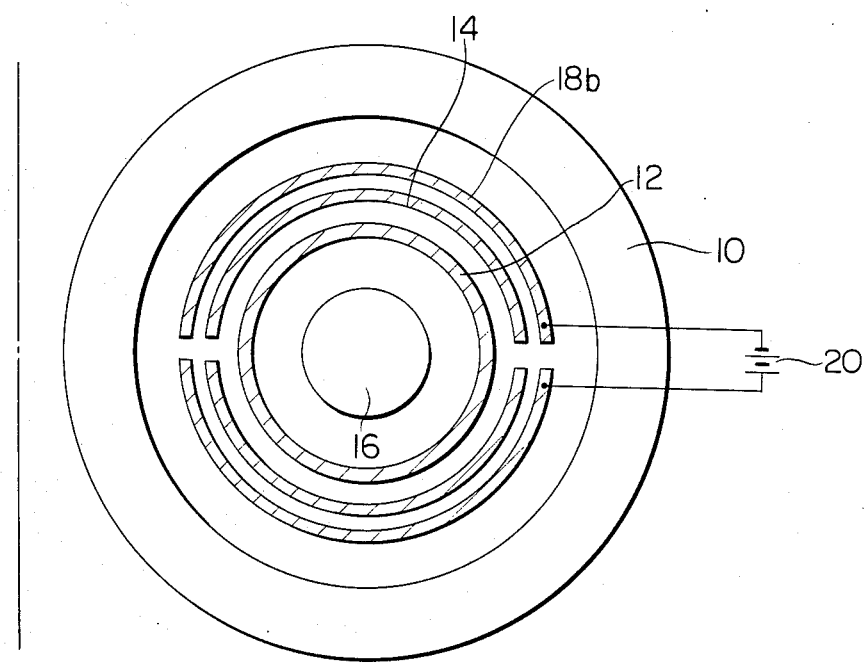
FIG. 3 is a longitudinal sectional view of one half of another conventional nuclear fusion reactor with an electric source connected across an air-core current transformer coil.

With the latest developments of nuclear fusion research, it has been initiated to build torus-shaped nuclear fusion reactors having the structure such as shown in FIG. 3 wherein like reference numerals designate components identical or corresponding to those shown in FIGS. 1 and 2. The arrangement illustrated is different from that shown in FIGS. 1 and 2 only in that in FIG. 3 an air-core current transformer coil 18b in the form of a toroid having a circular cross section is disposed on the outer peripheral side of the toroidal shell 14 to leave an annular toroidal gap therebetween with the omission of the air-core current transformer coil 18a shown in FIGS. 1 and 2. The coil 18b is of a low impedance type including a single turn of an electrically conductive metallic material such as copper, an aluminum alloy or a stainless steel. The coil 18b is divided into an upper and a lower half as shown in FIG. 3. The upper and lower halves of the coil 18b are connected across a DC source 20 to form an N and an S magnetic pole respectively with the lower half connected to the positive side of the DC source 20.

Figure 4:
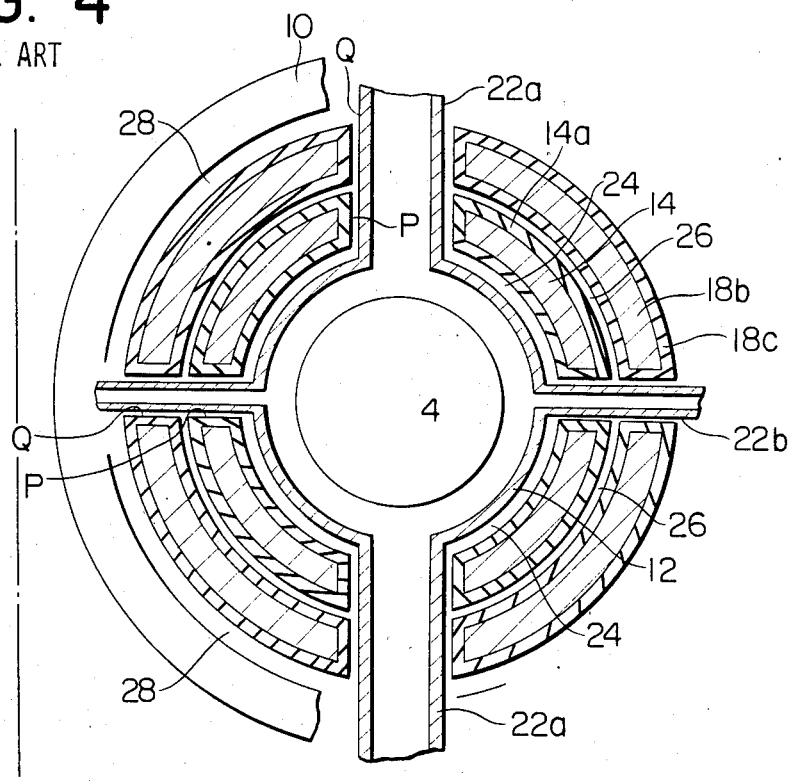
FIG. 4 is a view similar to FIG. 3 but illustrating in a enlarged scale the essential portions of the arrangement shown in FIG. 3 with parts omitted.

FIG. 4 shows in an enlarged longitudinal section a pair of vertical ports 22a radially protruding in vertically aligned opposite relationship from the evacuated container 14 and a pair of horizontal ports 22b radially protruding in horizontally aligned opposite relationship from the container 14 for observing a plasma confined within the toroidal evacuated container 14. The vertical port 22a is of a circular cross section and shown in FIG. 4 as being larger in diameter than the horizontal ports 22b which is also of circular cross section. Each of the ports 22a and 22b loosely extends through a radial hole P provided in the shell 14 and a radial hole Q provided in the air-core current transformer coil 18b to be equal in diameter to and radially aligned with the hole P.

The toroidal evacuated container 14 includes a plurality of sets of the two vertical ports 22a and the two horizontal ports 22b as shown in FIG. 4 radially protruding therefrom at predetermined equal angular intervals in the torus direction The number of such port sets is substantially equal to that of the circular coils 10 for the toroidal magnetic field. The coil 10 is not shown in section in FIG. 3.

Also, the toroidal shell 14 includes a plurality of tetrads of the holes P located so as to coincide in position with the port sets and radially aligned with the associated holes Q disposed in the air-core current transformer coil 18b. Thus, all the ports 22a and 22b loosely extend through the associated holes P and Q radially aligned with each other.

Since the shell 14 has the voltage induced thereon as described above, the entire surface thereof including all the holes P is coated with an electrically insulating layer 14a disposed thereon in accordance with an FBC process. Also, the entire surface of the air-core current transformer coil 18b including all the holes Q is similarly coated with an electrically insulating layer 18c disposed thereon in accordance with the FBC process because the same is applied with a voltage.

The toroidal shell 14 thus electrically insulated is positioned on the outer peripheral side of the toroidal evacuated container 12 to leave a predetermined annular toroidal gap 24 therebetween with all the plasma observing ports 22a and 22b extending through the associated holes P to leave predetermined annular clearances therebetween. Then the current transformer coil 18b similarly electrically insulated is positioned on the outer peripheral side of the toroidal shell 14 to leave a predetermined annular toroidal gap 26 therebetween while all the ports 22a and 22b having extended through the associated holes P extend through the holes Q in the current transformer coil 18b to leave predetermined annular clearances therebetween with the holes P radially aligned with the holes Q. At that time, the current transformer coil 18b forms a predetermined annular gap 28 with each of the circular coils 10 for the toroidal magnetic field. The circular coil 16 may be called hereinafter a "toroidal field coil".

The resulting structure is shown in FIG. 4.

In order to bear tare weights of shell 14, the air-core current transformer coil 18b and the toroidal evacuated container 12, and an electromagnetic force and a thermal force developed between the air-core current transformer coil 18b and each of the shell 14 and the evacuated container 12, the gap 26 between the shell 14 and the current transformer coil 18b could be filled with a filling composition of an epoxy resin system to connect the shell and the coil into a unitary structure after which the unitary structure was supported by pieces of an elastic rubber or the like inserted into the gap 28 left between the toroidal field coils 10 and the current transformer coil 18b. Alternatively, the unitary structure might be supported by a piece or pieces of the elastic rubber or the like inserted into the gap 24 between the evacuated container 12 and the shell 14. Otherwise, the unitary structure might be supported by a plurality of supporting pedestals disposed in the toroidal direction in the respective gaps 28 between the toroidal field coils 10 and the current transformer coil 18b through pieces of an elastic rubber or the like disposed on the outer periphery of the current transformer coil 18b although such a measure is not shown only for purposes of illustration.

However, the above-mentioned measures to support the shell 14 and the coil 18b formed into the unitary structure have been disadvantageous because the shell 14 and the coil 18b are electrically insulated in accordance with the FBC process as described above. The use of the FBC process results from the fact that, when the shell 14 and the coil 18b having curved surfaces are electrically insulated by sticking or taping electrically insulating film or sheet members to or around them, it cannot be ensured that the shell 14 and the coil 18b can withstand voltages, for example, on the order of from 10 to 20 Kilovolts, as well as the fact that the withstanding of voltages of this level can comparatively readily guaranteed by electrical insulations of the FBC type each formed only by dipping the entire body of an electric conductor into an FBC bath containing an epoxy resin to stick the resin to the entire surface of the electric conductor.

It is, however, normally not possible to stick the epoxy resin in a layer having a uniform thickness to the surface of the electric conductor in view of the operational standpoint. For an electrically insulating layer having a desired thickness of about 2 millimeters, for example, the resulting layer may normally be of about 4 millimeters on a thick portion.

Also, it has been found that the epoxy resin is particularly inclined to stick to walls of the port holes P and Q disposed in the shell 14 and the air-core current transformer coil 18b. In an extreme case, the port holes P and Q might be clogged with the epoxy resin. In the latter case, although the electrical insulations have been specially formed, a grinder or the like was used to scrape off the electrical insulations of the FBC type located in the port holes P and Q and instead, a film or a sheet member formed of a polyimide or the like was applied to the wall of each of the port holes P and Q.

Figure 5:
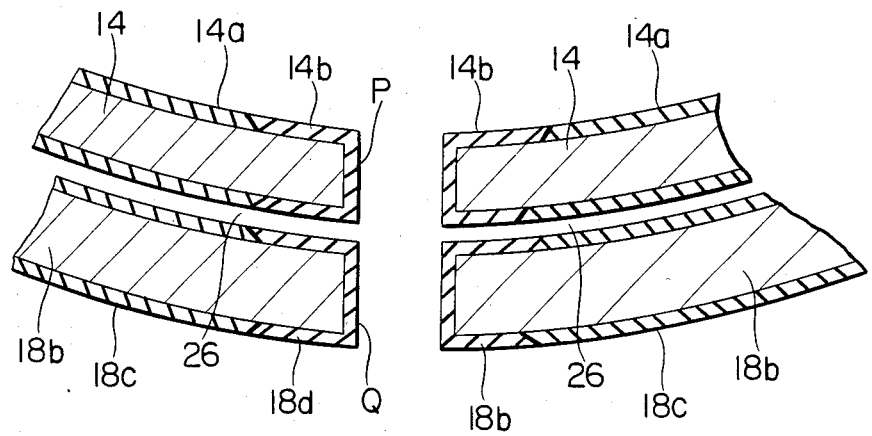
FIG. 5 is a fragmental longitudinal sectional view illustrating a different electrical insulation structure for a separate conventional nuclear fusion reactor.

FIG. 5 shows another conventional manner in which the port holes P and Q in the shell 14 and the current transformer coil 18b and the adjacent portions thereof are electrically insulated. As shown in FIG. 5, the wall of the port hole P in the shell 14 and the adjacent portions of the radially outer and inner surfaces thereof have been applied with a piece 14b of a film or a sheet member formed of a polyimide such as commercially available under a trade mark "KAPTON". In this connection it is noted that the wall of the port hole P in the shell 14 and the adjacent surface portions thereof are preliminarily masked and prevented from being electrically insulated in accordance with the FBC process. The manner shown in FIG. 5 results from the fact that an electrically insulating layer normally sticks unevenly to the wall of the port hole P and the adjacent portions thereof as described above. At that time, the piece 14b of the film or sheet member has a thickness preliminarily selected to be substantially equal to that of the electrically insulating layer 14a initially disposed on the shell 14 in accordance with the FBC process in order to connect the pieces 14b to the layer 14a without forming a difference in level therebetween.

The process as described above is repeated with each of the remaining port holes and the adjacent portions thereof which are not shown in FIG. 5. Thus, the entire surface of the shell 14 has been electrically insulated.

Also, the process as described above is repeated with the air-core current transformer coil 18b. In the latter case, a piece 18d of a film or sheet member identical to the piece 14b is applied to the wall of each of the port holes Q, one of which is shown in FIG. 5 as being disposed in the coil 18b and the adjacent surface portions thereof, and connected to a mating portion of electrically insulating layers 18c disposed on the surfaces of the coil 18b in accordance with the FBC process without the formation of a difference in level therebetween.

The electrically insulating method as described above in conjunction with FIG. 5 is effective for disposing on the shell 14 and the current transformer coil 18b uniform electrical insulations but the method has been disadvantageous in the following respects: When the pieces 14b and 18d of the electrically insulating material in the form of the film or sheet are applied to the shell 14 and the current transformer coil 18b, respectively, the pieces are apt to wrinkle and voids appear between each of the pieces 14b and 18d and the adjacent surface portion of the mating shell 14 or coil 18b. Thus, only low voltages can be quaranteed.

As nuclear fusion reactors have been recently increased in both operating voltage and output, the shell 14 and the air-core current transformer coil 18b are required to withstand higher voltages. This has attended the tendency of the reactors to generate electric discharges on the electrically insulating pieces 14b and 18d themselves and boundaries between those pieces and the mating portions of the electrically insulating layers 14a and 15c formed in accordance with the FBC process and particularly within the gap 26 between defined by the opposite surfaces of the shell 14 and the current transformer coil 18b. Those electric discharges have frequently resulted in damage to the electrical insulation occurring at those portions on which the electric discharges have been generated.

When such damage to the electrical insulation occurs after the shell 14 and the air-core current transformer coil 18b has been connected together into a unitary structure by filling the gap 26 therebetween with a filling material of an epoxy resin system, unitary structure may be impossible to be readjusted.

The present invention contemplates to substantially eliminate the disadvantages of the prior art practice as described above by the provision of a high voltage withstanding nuclear fusion reactor using electrically insulating insertions to electrically insulate holes for plasma observing ports disposed in an electrically conductive shell and adjacent portions thereof or those holes and adjacent portions and holes for the plasma observing ports disposed in an air-core current transformer coil to be radially aligned with the holes in the shell and adjacent portions of the coil to enhance an electrical insulation at a boundary between each of the electrically insulating insertions and a mating portion of electrically insulating layers disposed on the shell or each of the shell and coil in accordance with an FBC process.

Figure 6:
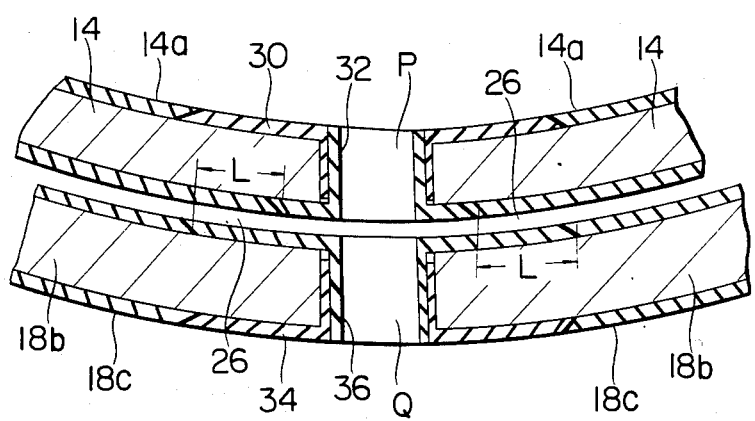
FIG. 6 is a fragmental longitudinal sectional view of one embodiment according to the electrical insulation structure of the present invention for a nuclear fusion reactor.

Referring now to FIG. 6, wherein like reference numerals designate the components indentical to those shown in FIGS. 4 and 5, there is illustrated one embodiment according to the electrical insulation structure of the present invention for a nuclear fusion reactor. The arrangement illustrated is different from that shown in FIGS. 4 or 5 only in means for electrically insulating the port holes disposed in the electrically conductive shell and the air-core current transformer coil and adjacent portions thereof. The electrically conductive toroidal shell 14 divided as described above is coated with the respective electrically insulating layers 14a disposed on the surfaces thereof in accordance with the FBC process except for the wall of each of the port holes P and the adjacent portions of the radially inner and outer surfaces thereof. In the example illustrated, the adjacent portion of the radially inner surface of the shell 14 not covered by insulating layer 14a has a termination more radially spaced from the central axis of the associated port hole P than that of the radially outer surface thereof for the purpose as will be apparent later.

Similarly, the air-core current transformer coil 18b divided as described above is coated with the respective electrically insulating layers 18c disposed on the surfaces thereof in accordance with the FBC process except for the wall of each of the port holes Q and the adjacent portions of the radially inner and outer surfaces thereof. In the current transformer coil 18b the adjacent portions of the radially inner and outer surfaces thereof terminate at distances from the central axis of the associated port hole Q substantially equal to each other and also substantially equal to the distance between the termination of the adjacent portion of the radially inner surface of the shell 14 and the central axis of the port hole P radially aligned with the associated port hole Q.

In order to electrically insulate the port holes P disposed in the shell 14 and the adjacent portions of the radially inner and outer surfaces thereof left exposed, a plurality of insertions are formed, for example, of a fiber reinforced plastic (which may be abbreviated "FRP") so that one set thereof includes a cylindrical section coextensive with and snugly into anassociated one of the port holes P, for example, the vertical port hole P (see FIG. 4) and a flange section extending radially from one end of the cylindrical section so as to run along one of the radially inner and outer surfaces of the shell 14 radially of the associated port hole P until the flange section abuts against a mating portion of the electrically insulating layers 14a, and that the other set thereof includes a cylindrical section coextensive with and snugly fitted in the cylindrical section of the one set and a flange section radially extending from one end of the cylindrical section so as to run along the other of the radially inner and outer surfaces of the shell 14 until the flange section abuts against a mating portion of the electrically insulating layers 4a.

The electrically insulating insertion included in the one set are designated by the reference numeral 30 and those included in the other set are designated by the reference numeral 32.

Also, two sets of electrically insulating insertions 30 and 32 are similarly prepared for the horizontal port holes P (see FIG. 4).

Each of the port holes P is electrically insulated by inserting one pair of electrically insulating insertions 30 and 32 thereinto. More specifically, the cylindrical section of the electrically insulating insertion 30 is first snugly fitted into the associated port hole P in the shell 14 from one end, inthis case, the radially inner end as viewed in FIG. 6 of the port hole P and the flange section thereof is disposed on the radially inner surface as viewed in FIG. 6 of the shell 14 and connected to a mating portion of the electrically insulating layer 14a on that surface thereof. Then the electrically insulating insertions 32 is inserted into the port hole P from the radially outer end thereof so that the cylindrical section of the cap 32 is snugly fitted into the cylindrical section of the insertion 30 snugly fitted into the port hole P and the flange section of the insertion is disposed on the radially outer surface as viewed in FIG. 6 of the shell 14 and connected to a mating portion of the electrically insulating layer 14a on that surface thereof.

It is noted that the flange section of each insertion 30 and 32 has a thickness preselected to be substantially equal to that of the mating portion of the electrically inslulating layers 14a. Thus the flange section of each of the insertions 30 and 32 is connected to the mating portion of the electrically insulting layers 14a formed inaccordance with the FBC process without the formation of a difference in level therebetween.

The port holes Q disposed in the current transformer coil 18b and the adjacent portions of the radially inner and outer surfaces thereof are electrically insulated by pairs of electrically insulating insertions 34 and 36 formed into similar shapes to the insertions 30 and 32 and of the same material as the latter. In FIG. 6 the port hole Q and the adjacent portions of the radially inner and outer surfaces of the current transformer coil 18b is shown as being electrically insulated by first snugly fitting the cylindrical section of the electrically insulating insertion 34 into the port hole Q from the radially outer end thereof and then snugly fitting the cylindrical section of the electrically insulating insertion 36 into the cylindrical section of the insertion 34 snugly fitted into the port hole Q from the radially inner end thereof with the flange sections of the insertions 34 and 36 disposed on the radially outer and inner surfaces of the coil 18b and connected to mating portions of the electrically insulating layer 18c formed on those surfaces in accordance with the FBC process. In this case, also, the flange sections of the insertions 34 and 36 are substantially equal in thickness to the mating protions of the electrically insulating layers 18c, respectively. Thus, each flange section is connected to the mating layer portion 18c without the formation of a difference in level therebetween.

It desired, the insertion 34 may be first inserted into the port hole Q from the radially inner end thereof and then the insertion 36 is inserted into the cylindrical section of the insertion 3 inserted into the port hole Q.

By molding, for example, a fiber reinforced plastic under a pressure into the desired shapes, the electrically insulating insertions 30, 32, and 36 are separately formed and then subjected to a withstand voltage test.

Those insertions 30, 32, 34 and 36 as determined as being usable in accordance with this withstand voltage test are used to electrically insulate the port holes P and Q disposed in the shell 14 and the current transformer coil 18b, respectively, and the adjacent portions thereof.

Also, the weakest dielectric strength is developed at a boundary between each of the electrically insulating insertions 30, 32, 34 and 36 and the mating FBC type electrically insulating layer 14a or 18c located on the surfaces of the shell 14 or the current transformer coil 18b. As described above in conjunction with FIG. 5 damage to the electrical insulation has frequently occurred at the boundaries between the electrically insulating layers 14a and 18c of the FBC type and the film or sheet members 14b and 18c on the radially inner and outer surfaces respectively of the shell 14 and the current transformer coil 18b opposing each other, when those boundaries are substantially equidistant from the associated port holes P and Q radially aligned with each other.

In order to avoid the damage to the electrical inslulation as described above, the boundary between the insertion and layer on the radially outer surface of the shell 14 is nearer to the central axis of the associated port hole P than that on the radially inner surface of the current transformer coil 18b by a predetermined distance L as shown in FIG. 6. In other words, the flange sections of the insertions 32 and 36 opposing each other through the gap 27 have respective terminations spaced from each other by the predetermined distance L in the radial direction of the associated aligned port holes P and Q. This distance L is sufficient to prevent a dielectric breakdown from occurring at either of the boundries the insertions 32 and 36 and the layers 14a and 18c disposed on the opposite surfaces of the shell 14 and the coil 18b. Also, the distance L is selected to ensure that a creeping discharge is prevented from occurring between those boundaries.

In the example illustrated, the flange section of the electrically insulating insertion 32 is shorter than that of the insertion 36. If desired, the flange section of the insertion 32 may be longer in length than that of the insertion 36.

Thus, in nuclear fusion ractors comprising the electrically conductive shell 14 and the air-core current transformer coil 18b operatively combined with each other and electrically insulated as described above in conjunction with FIG. 6, and a filling material of the epoxy resin system charged into the gap between the shell 14 and the coil 18b to form them into a unitary structure, in order to bear tare weights of the shell 14 and the coil 18b and an electromagnetic force developed theretetween, the inventor provides for both a through and a creeping dielectric strength have reliabilities several times larger than that in accordance with the prior art practice.

Still more, it will readily be understood that that boundaries between the electrically insulating insertions 30 and the electrically insulating layers of the FBC type 14a on the radially inner surface of the shell 14 and the boundaries between the electrically insulating insertions 34 and the FBC type electrically insulating layers of the FBC type 18c on the radially outer surfaces of the air-core current transformer coil 18b are applied with reinforcing electrically insulating sheets or supporting rubber sheets interposed between the same and the adjacent protion of the evacuated container 12 as shown in FIG. 4 and between the same and the toroidal field coils 10 as shown in FIG. 4 although those sheets are not shown only for purposes of illustration.

From the foregoing it is seen that, according to the present invention, an electrically conductive shell and an air-core current transformer coil are electrically insulated by electrically insulating layers disposed thereon in accordance with an FBC process except for the port holes therein and the adjacent portions thereof while the port holes and the adjacent portions thereof are electrically insulated by electrically insulating insertions separately formed and disposed therein and thereon until each of the insertions is connected to the associated electrically insulataing layer. Therefore, the present invention provides a nuclear fusion reactor having an enhanced electrical inslulation characteristic at boundaries between the electrically insulating insertions and the ating electrically insulating layers of the FBC type resulting in a high dielectric strength.

While the present invention has been illustrated and described in conjunction with a single preferred embodiment thereof it is to be understood that numerous changes and modifications may be resorted to without departing from the spirit and scope of the present invention. For example, while the present invention has been illustrated and described in conjunction with a nuclear fusion reactor comprising an air-core current transformer coil superposed on an electrically conductive shell to leave a gap therebetween such as shown in FIGS. 3 and 4, it is to be understood that the same is equally applicable to a nuclear fusion reactor comprising a toroidal evacuated container surrounded only by a toroidal shell such as shown in FIG. 1 but not by an air-core current transformer coil. Also, the shell and the air-core current transformer coil have been described as being formed of an electrically conductive metallic material such as copper, an aluminum alloy or a stainless steel, but each of the shell and the air-core current transformer coil may be formed of an electrically conductive material other than the metallic materials as described above.

What is claimed is:

1. A nuclear fusion reactor, comprising: an evacuated container for containing a plasma, having a plurality of ports extending radially outwardly therefrom for observing the plasma, a toroidal shell of an electrically conductive metallic material surrounding said container, a plurality of first port holes being formed in said shell, said shell being coated with a first electrically insulating layer formed on the surface thereof in accordance with a fluidized bed dip coating process except for the first port holes and the portions of said shell adjacent to said port holes, an air-core current transformer coil in the form of a toroid disposed on the outer peripheral side of the toroidal shell to form an annular toroidal gap therebetween, a plurality of second port holes identical to and radially aligned with the first port holes being formed in said coil, said coil being coated with a second electrically insulating layer formed on the surface thereof in accordance with the fluidized bed dip coating process except for the second port holes and the portions of said coil adjacent to said second port holes, said ports extending through each aligned first port hole and second port hole, and a plurality of pairs of electrically insulating insertions formed of an electrically insulating material, insulating respective associated ones of the first and second port holes and said portions of said shell and said coil respectively adjacent to said first port holes and said second port holes, each of said pairs of electrically insertions including a first insertion including a first cylindrical section snugly fitted into an associated one of the first and second port holes from one end thereof, and a first flange section radially extending from an end of said first cylindrical section at said one end of said associated one of said first and second port holes on said portions of the shell and the coil adjacent to the first and second port holes, and a second insertion including a second cylindrical section snugly fitted into said first cylindrical section from the other end of said associated one of the first and second port holes, and a second flange section radially extending from an end of the second cylindrical section at said other end of said associated one of said first and second port holes on said portions of the shell or the cirrent transformer coil adjacent to said first and second port holes, said first and second flange sections being connected to mating portions of the electrically insulating layer of the fluidized bed dip coating type adjacent thereto in abutting relation thereto, said portions of said shell adjacent said fist holes and said portions of said coil adjacent said second holes, and the flange portions thereon, having such surface dimensions that the boundaries between ones of the flange sections disposed on opposing ones of the surfaces portions of the shell and the coil adjacent to the associated aligned port holes and the respective mating portions of the electrically insulating layers are radially spaced away from each other by a predetermined distance.

2. A nuclear fusion reactor as claimed in claim 1 wherein the shell and the air-core current transformer coil are connected together into a unitary structure by filling the annular toroidal gap therebetween with an epoxy resin.

3. A nuclear fusion reactor as claimed in claim 1, wherein the electrically insulating insertion is formed of a fiber reinforced plastic.

4. A nuclear fusion reactor as in claim 1, wherein said first insulating layer and the flanges of said first insertions have the same thickness, and said second insulating layer and the flanges of said second insertions have the same thickness.

* * * * *